Nov. 6, 1951  F. F. HEITZIG  2,573,969
TWO-WAY PLOW
Filed May 27, 1950  4 Sheets-Sheet 1
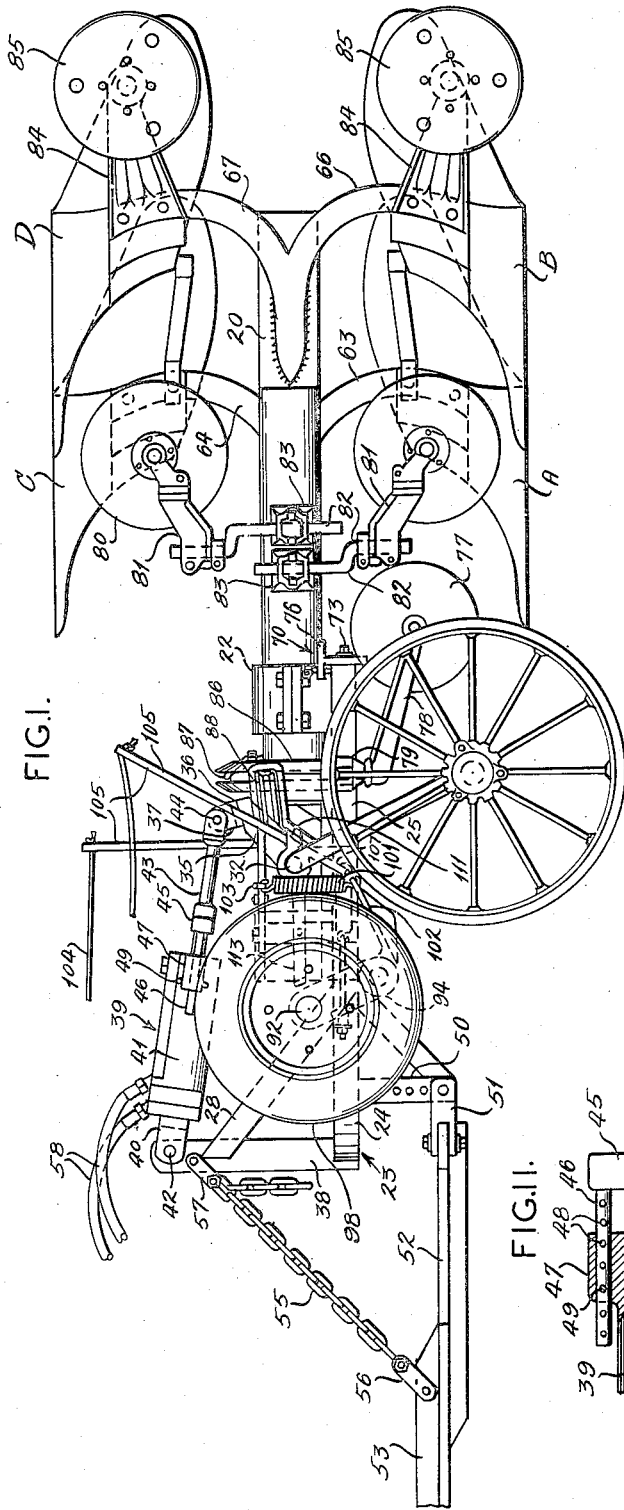
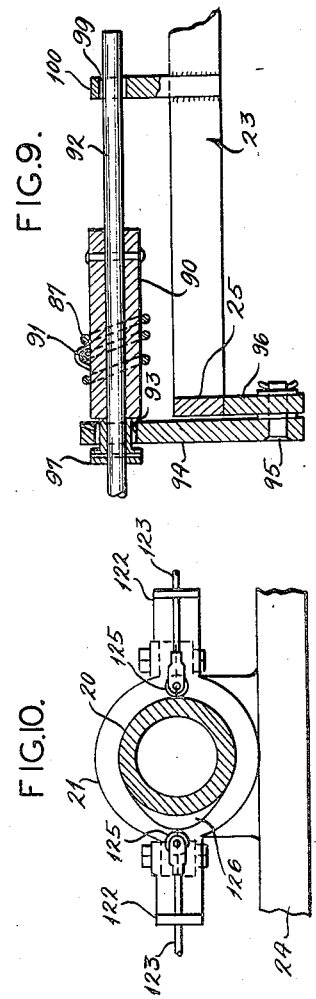
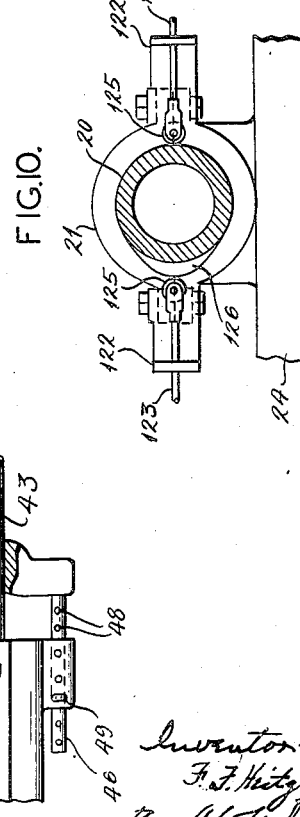
Inventor-
F. F. Heitzig
By W. C. Fisher
Attorney Nov. 6, 1951  F. F. HEITZIG  2,573,969
TWO-WAY PLOW Filed May 27, 1950  4 Sheets-Sheet 3

Inventor-
F. F. Heitzig
By A. E. Fisher
Attorney

Nov. 6, 1951 — F. F. HEITZIG — 2,573,969
TWO-WAY PLOW
Filed May 27, 1950 — 4 Sheets-Sheet 4
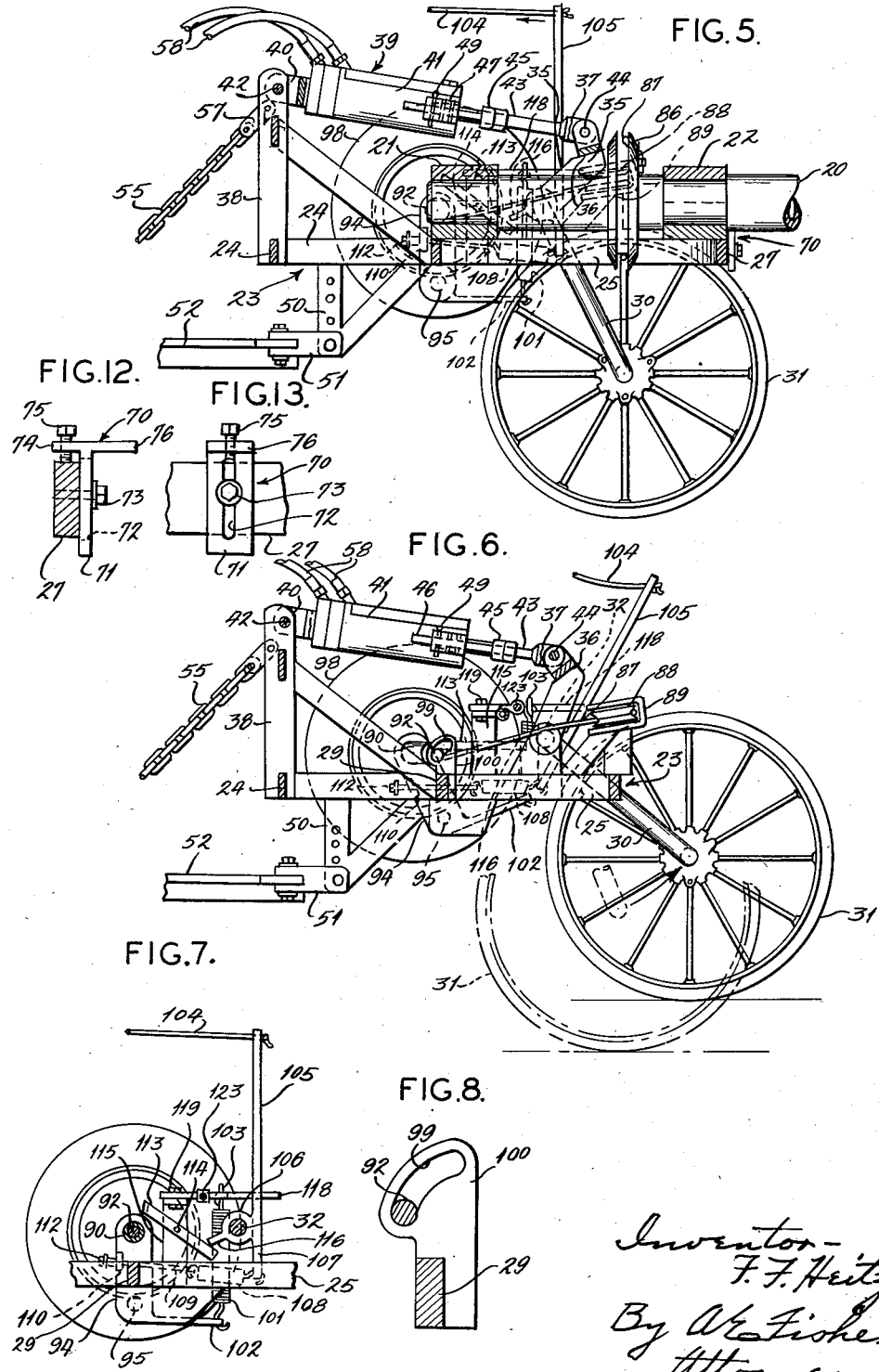

Patented Nov. 6, 1951

2,573,969

UNITED STATES PATENT OFFICE 2,573,969

TWO-WAY PLOW

Frederick F. Heitzig, Fieldon, Ill.

Application May 27, 1950, Serial No. 164,786

11 Claims. (Cl. 97—26)

This invention relates generally to improvements in tractor plows and more particularly to the type of plow known as the two-way plow, which travels back and forth across the field and takes the furrow slices off the same end of the land each trip. In addition to eliminating dead furrows and back ridges, this two-way plowing is very desirable for terracing and other modern top soil and moisture conserving farming methods.

It will, of course, be understood that a two-way plow thus has right and left hand plow bottoms which are used alternately according to the direction the machine is traveling, and provision must therefore be made for lifting each set of bottoms into the clear at the end of the furrow, while lowering the other set into plowing position. There are at present on the market machines in which the bottoms are turned about in horizontal or vertical planes; but in accordance with my invention, and as an important object thereof, I provide right and left hand plow units arranged to turn about a generally horizontal and longitudinal axis, along with comparatively simple mechanism for positioning the plows as required. In a two bottom plow, for example, four bottoms are required and this mounting of the plows for movements about an axis parallel with the direction of travel enables me to obtain a maximum of clearance for the necessary operations of the plows, with a minimum of overall height and resulting very low center of gravity for the machine as a whole.

Another object of my invention is to provide a two-way plow of comparatively light draft and relatively unchanging line of draft regardless of which set of plow bottoms may be in use. One virtue of the two-way plowing principle is its utility in side hill work and this unchanging draft line, along with the low center of gravity of the machine aforementioned, will be of particular advantage in such work.

Another object of my invention is to provide a two-way plow constructed in a practical fashion, to properly level the plow bottoms as the shift is made from one set to the other, and in which the plows are raised and lowered to and from transport position hydraulically, with provision for convenient adjustment of the plowing depth.

A further object is to provide a two-way plow wherein the plow bottoms are shifted or oscillated at the ends of the furrows by mechanism operated by the travel movement of the plow, and which mechanism is itself of simple and durable construction, consisting of cables arranged to turn the plow assembly, and operated by winches selectively driven by the ground wheels of the plow under the control of trip ropes extended forwardly for control by the tractor operator from his seat on the tractor.

These and other objects and advantages of my invention will be made apparent in the course of the following detailed specification, wherein reference is made to the accompanying drawings, in which—

Figure 1 is a side elevation of a two-way plow according to my invention, showing the same in its transport position.

Figure 5 is a fragmentary longitudinal and vertical sectional view, taken substantially along the line 5—5 in Figure 2.

Figure 6 is a side elevation of the same portion of the machine as shown in Figure 5, but with the parts in the lowered, plowing position.

Figure 7 is a slightly enlarged detail sectional view along the line 7—7 in Figure 2, showing certain parts of the actuating mechanism for turning over the plow assembly.

Figure 8 is a further enlarged detail section along the line 8—8 in Figure 2.

Figure 9 is an enlarged detail section along the line 9—9 in Figure 2.

Figure 10 is an enlarged detail cross-section through a center bearing portion of the machine, along the line 10—10 in Figure 2.

Figure 11 is an enlarged, fragmentary plan view, partially in section, of the rear part of the height adjusting ram, showing the manner in which the plowing depth is adjusted.

Figure 12 is an enlarged detail section, along the line 12—12 in Figure 2, and showing the adjustable stop for the oscillating plow assembly.

Figure 13 is a rear end view of the stop as shown in Figure 12.

Figure 2:
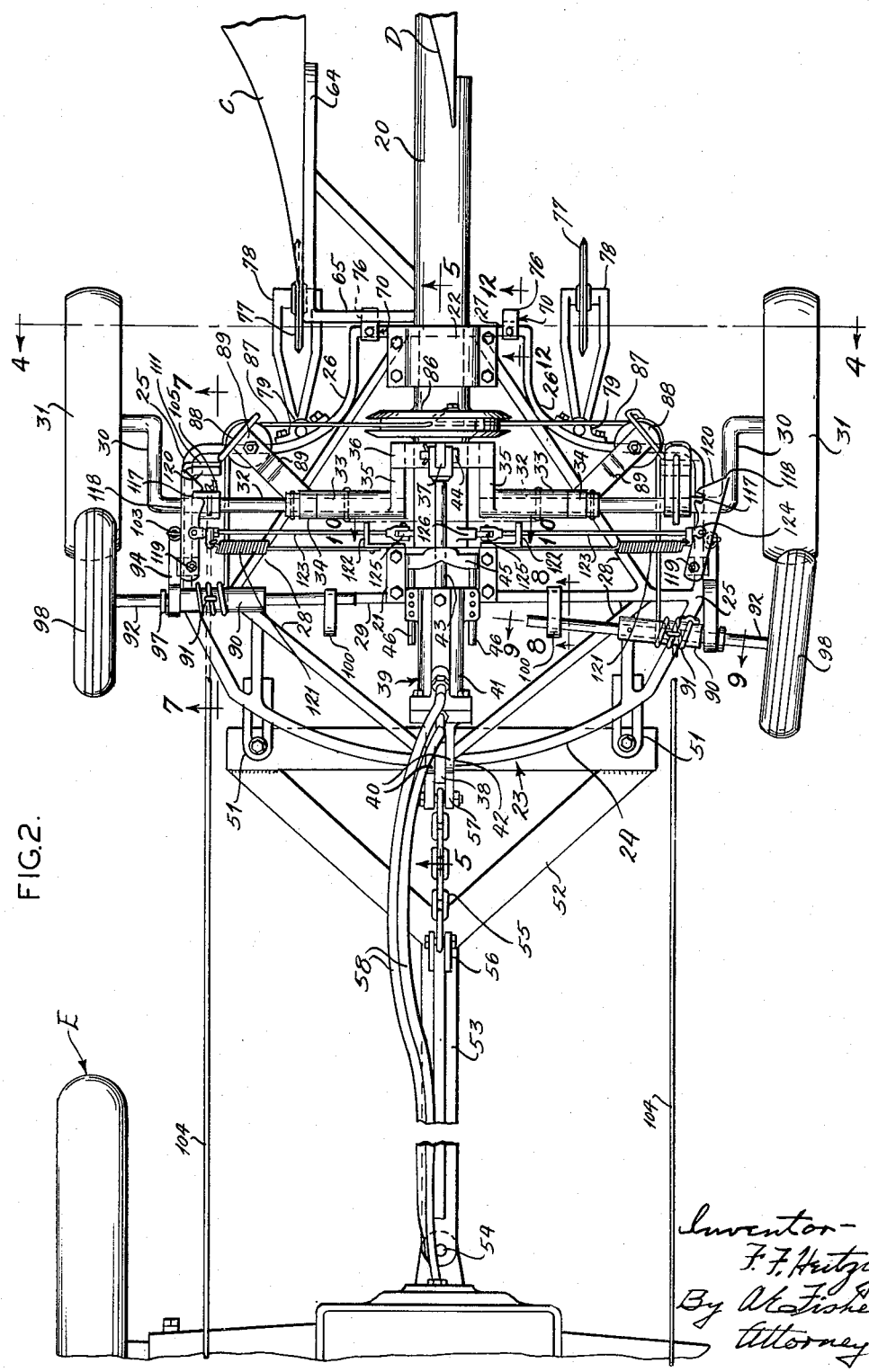
Figure 2 is an enlarged plan view, omitting a rear portion of the plow assembly and showing a part of the tractor as well as the draft connection.

Referring now more particularly and by reference characters to the drawing, I have disclosed my two-way plow therein as having a pair of right hand bottoms A—B and a pair of left hand bottoms C—D, which pairs are arranged to be brought alternately into a lower position for plowing by successive half turns or oscillations about a generally horizontal and longitudinal axis. This turn-over plow assembly or group is carried on a heavy center bearing member or spindle 20 of tubular construction, journaled at its forward end portion in and through front and rear journals 21 and 22, and carried upon the main frame of the plow, as designated generally at 23. The details of the plow assembly, mounting and operation will presently appear.

The main frame 23 has a forward portion 24 from which side members 25 extend rearwardly and curve inwardly at 26 and terminate finally in a short rear portion 27. Suitable diagonal braces, designated throughout at 28, tie this frame structure rigidly together, along with a main cross member 29. Conventional crank axles 30, on which ground wheels 31 are journaled, have their upper pintle portions 32 turned inwardly across the top of the frame and fixed in sleeves 33 which are journaled in bearings 34 carried by the frame. The sleeves 33 are spaced apart at the center of the frame and joined to upwardly and rearwardly turned arms 35 connected by a cross bar 36 on which is affixed an apertured lug 37. The front center of the frame 23 has an upright 38 spaced well forward of the cross bar 36, and a hydraulic lift ram 39 is provided, having the lugs 40 at the forward end of its cylinder 41 pivoted at 42 to this upright. The rearwardly projecting plunger 43 of the ram is forked and pivotally attached at 44 to the lug 37 in such fashion that the rearward extension of the plunger, by fluid entering the forward end of the cylinder 41, will swing the arms 35 and turn the attached sleeves 33 and pintles 32 in a clockwise direction as viewed in Figure 1, and vice versa. Obviously, this clockwise motion of the pintles 32 will swing the crank axles 30 downward to elevate the frame, while the opposite motion will lower the frame. The down motion of the frame will determine the plowing depth in the usual fashion and to limit this motion, and select the plowing depth, a crosshead 45 is mounted on the ram plunger 43 and carries forwardly turned pins 46 at its ends which slide through apertured lugs 47 on the sides of the ram cylinder. These pins 46 each have a series of openings 48 (Figure 11), and by the proper placement of pins 49 in the respective lug and pin openings, the forward, return motion of the plunger in lowering the frame may be selected and limited to secure the desired effect, in a well known manner.

The forward end of the frame 23 has transversely spaced depending hitch lugs 50, apertured for hitch height adjustment, and clevis fittings 51 attach a triangular hitch frame 52 to these lugs at various and selected elevations. A draft tongue 53 is secured to the converging forward end of this hitch frame for attachment, as indicated at 54, to the draw bar of the conventional tractor used for pulling the plow, and a rear portion of which is designated generally at E. A chain 55 is attached at 56 to the forward end of the hitch frame 52, and may be secured by selected links to a fitting 57 on the upper part of the front upright 38 of the frame 23. It is obvious that the adjustment of this chain will level the entire plow assembly in a fore and aft plane, in the transport position. In the plowing position, the chain will be slackened, thus permitting the plows to rest on wheel 85.

Fluid for operation of the hydraulic lift ram 39 is supplied through flexible conduits 58 leading to the tractor E which has the usual pump, reservoir and control valve (not shown) with which most modern tractors are equipped.

The plow bottoms A through D are, as stated, carried as an oscillating, turn-over assembly upon the spindle 20 which is a heavy tubular member extending rearwardly from the center of the frame 23. The front and rear bearings 21 and 22 journal this spindle 20 for oscillating, rocking motions about a generally horizontal, longitudinal axis, as will be readily apparent. The right and left hand forward plow bottoms A and C are offset from the axis of the spindle, having their curved beams 63 and 64 rigidly attached to a heavy and rigidly braced radial member or arm 65 secured on the spindle. The right and left hand rear bottoms B and D are attached by their curved beams 66 and 67 directly to the side of the spindle opposite that from which the arm 65 extends, thus properly offsetting the front and rear bottoms for turning the two furrow slices of proper width. It will be noted, particularly in Figures 3 and 4, that the bottoms are thus so placed that as either the right or left hand pair are down in plowing position, the unused pair is immediately overhead, and the weight is thus so distributed about the axis of the spindle 20 as to hold the working units in the ground. Also, it will be apparent that successive half-turn, oscillatory movements of the spindle and its assembled plow units, will bring the right and left hand bottoms alternately into their working position, but that in each position the line of draft, with reference to the draft tongue 53, will be approximately the same, to facilitate side hill work in particular. Further, it will be evident that the turning of the plows about a longitudinal axis, requires a minimum of vertical clearance, particularly in a two bottom plow, and that thus the overall height of the machine is kept at a minimum with a resulting low center of gravity and improved operation in general, as referred to hereinbefore.

As the plow assembly turns in either direction, to bring the right or left hand bottoms into plowing position, the arm 65 comes to rest upon stops or stop brackets 70 spaced at opposite sides of the spindle 20 upon the short, rear cross member 27 of the main frame. These stops are, as best shown in Figures 12 and 13, T-shaped and each has a depending leg 71 vertically slotted at 72 to receive a cap screw 73, by which it is held upon the rear face of the said frame member 27. The head of the bracket has a forwardly projecting portion 74, which overlies the frame member 27 and carries a set screw 75 so that, when the cap screw 73 is loosened, the bracket may be raised or lowered quite precisely and then locked by tightening the cap screw. The stop bracket also has a rearwardly turned finger 76 which lies in the path of the arm 65 as the plow assembly swings. Such adjustments of these stops obviously will precisely limit the turn over movement of the plow assembly to properly level the plow bottoms in transverse planes.

Figure 3:
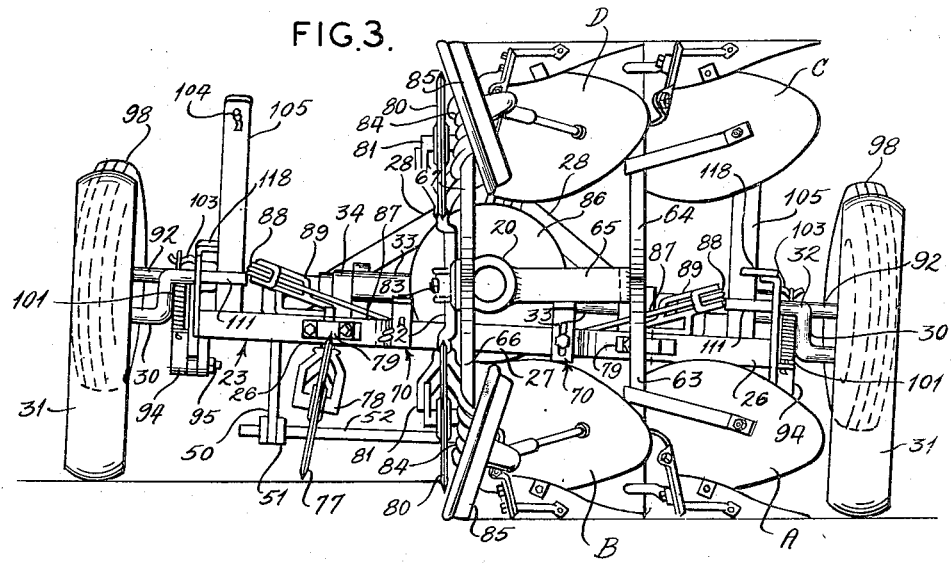
Figure 3 is a rear end view of the plow with one set of plow bottoms in the ground.
Figure 4:
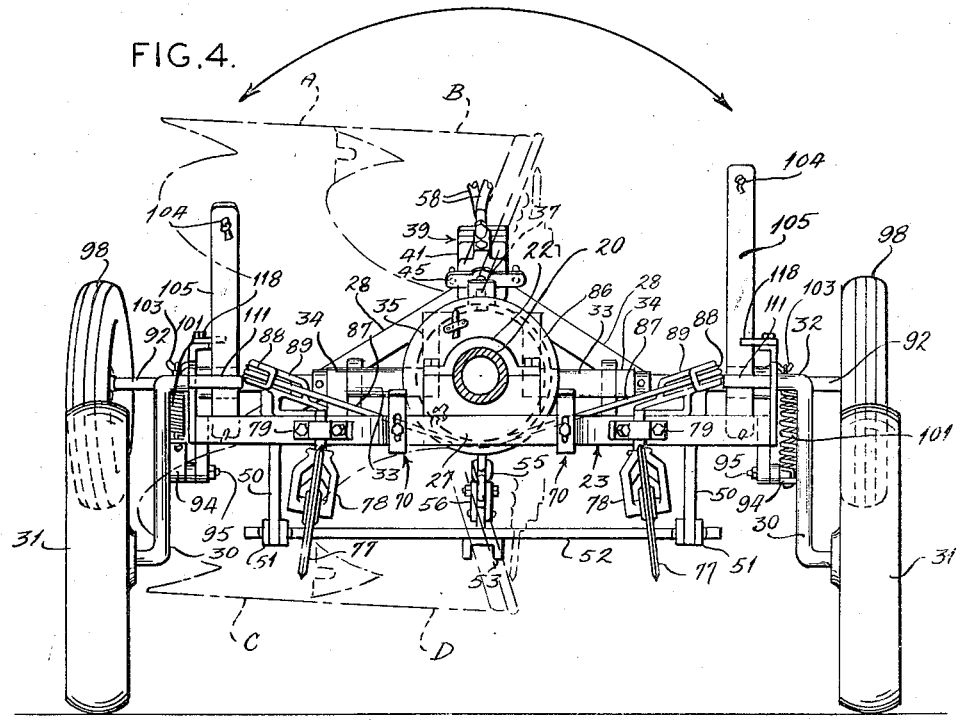
Figure 4 is a vertical, cross sectional view of the plow, taken at a point forward of the plow bottoms.

For the forward plow bottoms A and C, coulters 77 are provided on the frame 23 in proper spacing at opposite sides of the spindle 20. These coulters are mounted by conventional forks 78 and brackets 79 on the incurving rear ends 26 of the frame, so as to run in proper relation to the plow points. Due to the transverse tilt of the frame, when one wheel 31 runs in the furrow as seen in Figure 3, the coulter 77 (not in use) will substantially clear the ground. For the rear bottoms B and D, coulters 80 are carried by the usual forks 81, cranked supporting stems 82, and brackets 83 upon the same side of the spindle 20 as the rear beams 66 and 67 are mounted. Also attached to these beams 66 and 67 are arms 84 which carry inclined furrow wheels 85 adapted to run at the junction of the furrow wall and side, as seen in Figure 3, for the usual purpose.

The plow bottom assembly is turned over, in first one direction and then the other, by mechanism operated, when the plow frame is raised to transport position, by the travel movement of the plow as it is pulled about at the end of each furrow, as will now be described.

Between the bearings 21—22 the spindle 20 has firmly affixed a grooved sheave 86 and flexible cables 87 are attached to this sheave and led off therefrom in opposite lateral directions. Some distance from the spindle these cables 87 pass rearwardly, then forwardly around idler pulleys 88 carried by angular brackets 89 secured to the frame 23, and the cables are then led forwardly, inward of the ground wheels 31. These forward ends of the cables are operated by travel-driven winch mechanisms consisting of elongated drums 90 on which the cables are wound and fastened at 91, these drums 90 being secured on short axles 92 disposed in transverse planes at opposite sides of the frame. Adjacent their outer ends the axles 92 are loosely journaled (see 93 in Figure 9) through the upper ends of upright carriers 94 pivoted at lower ends on pins 95 carried by side plates 96 depending from the main frame sides 25. The actual bearings are formed by the reduced ends of collars 97 pinned to the axles, and this construction obviously is such as to restrict end play of the axles through the carriers 94. This pivotal mounting of the carriers 94 permits their upper ends, and the outer end portions of the axles 92, to move forwardly and rearwardly with respect to the frame, and being in a rear position of the axle drive wheels 98 secured on the outer extremities of the axles, are thus adapted to contact forward tread surfaces of the ground wheels 31 when the latter are forwardly located as they are when the plow is in its elevated, transport position. The inner ends of the axles 92 play in arcuate slots 99 in brackets 100 secured firmly to the cross member 29. The curvature and angle of these slots 99 (Figure 8) are such that as the axles 92 are moved rearwardly and the drive wheels caused to run on the ground wheels 31, the axles will straighten (see upper part of Figure 2) and lie substantially parallel with the axes of the ground wheels for best operation. Normally, in the forward positions of the axles 92 (lower part of Figure 2) they angle forward at their outer ends and hold the drive wheels 98 well clear of the ground wheels. The axles are held in the latter, normal position by retractile coil springs 101 which are stretched between fingers 102 extending rearwardly from the lower ends of the carriers 94 and upper connections 103 to latch members presently to be described.

It will be understood that when one of the drive wheels 98 is brought into contact with the adjacent ground wheel 31, the continued travel movement of the plow will cause that wheel 98 and its axle 92 to be rotated. To ensure this, the wheels 98 are rubber tired, as clearly shown. Such rotation of the one axle 92, while the other axle is free to rotate since its drive wheel 98 is clear of the other ground wheel, will wrap up one cable 87 on the drum 90 while paying out the other cable. The resulting pull on the cable being wound up will turn the sheave 86 and connected spindle 20 and plow bottom group a partial turn to bring the previously uppermost plow bottoms down into plowing position. Thus the proper selective and alternate engagement of the drive wheels 98 with the ground wheels 31 will bring about the desired alternation of the right and left hand plows.

The tractor operator from his station on the tractor E controls the application of the drive wheels 98 to the ground wheels by means of trip ropes 104 which extend rearwardly from the tractor to the upper ends of trip levers 105, one for each drive wheel. As best shown in Figure 7, these trip levers 105 each has a bearing 106 near its lower end, rotatably fitted on the pintle 32 of the adjacent crank axle 30, and an end 107 which extends some distance therebelow. A retractile coil spring 108 is connected to this lower end 107 and has an eye bolt 109 on its forward end which extends loosely forward through an apertured lug 110 on the adjacent carrier 94. The spring 108 thus normally swings the lever back to the rearwardly and upwardly angled position, of Figure 6 for example, where the lever 105 rests against a stop 111. A nut 112 on the forward end of the eye bolt 109 permits the effective tension of the spring to be conveniently adjusted.

In their normal forward positions, the axles 92 are held positively forward by stop members 113 pivoted at 114 (Figure 7) upon upright bracket members 115 secured to the frame sides 25. As seen in Figure 6, these stop members 113 normally and of their own weight, lie horizontal and bear between the axles 92 and the bearings 106. These bearings 106, however, have forwardly projecting lugs 116 and as the trip levers 105 are pulled forward, these lugs bear down on the rear ends of the stop members 113 forcing their forward ends up clear of the axles 92 so that the latter may move rearward as necessary to engage the drive wheels 98 with the ground wheels 31.

As the trip levers 105 are pulled forward by their trip ropes 104, they are engaged in notches 117 in latch members 118 which are pivoted at their forward ends 119 atop the brackets 115. The aforesaid spring connections 103 are anchored to these latch members. To so engage the trip levers, the rear ends of the latch members 118 have angular cam noses as seen at 120 in Figure 2. These latch members 118 are normally pulled inward by springs 121 connected between the latch members and L-shaped brackets 122 secured to the frame 23. Paralleling these springs are push rods 123 which are pivotally attached at 124 to the latch members 118 and at their inner ends are slidably mounted through the brackets 122. At their inner extremities the push rods 123 are forked to carry follower rollers 125 adapted to ride the peripheral surface of the spindle 20, immediately to the rear of the bearing 21, and to be alternately engaged by a cam 126 formed on said surface of the spindle. (See Figure 10.) It will be noted that the cam 126 will always engage one of the rollers 125 and urge one of the push rods 123 outward to swing the connected latch member 118 clear of the path of the trip lever 105 at that side of the machine.

In operation then, to change from right to left hand plows, or vice versa, as the case may be, at the end of each furrow, the operator pulls the proper trip rope 104 and the connected lever 105 will be pulled forwardly and will snap into the notch 117 of the latch member 118 at the proper side of the machine. When the trip lever is pulled forward, its lug 116 lifts the stop member 113 and at the same time the spring 108 is placed under increased tension, so that it overcomes the spring 101 and pulls the carrier 94 at that side rearward from its normal position. The axle 92 is now moved back and as the operator actuates the lift ram 39 to raise the plow, the drive wheel 98 will contact the drive wheel 31. As this occurs the axle 92 will begin to turn, taking up the cable 87 at that side, and as it tightens and begins to wind on the drum 90, the increasing tension will hold the drive wheel 98 tight against the ground wheel to ensure smooth and powerful operation. At the same time the cable at the opposite side will unwind freely since the axle 92 at that side is positively held forward by the stop member 113.

There results thus a turn over movement of the plow assembly in one direction, and as this motion is completed the cam 126 moves around, pushing on the rod 123 and forcing the latch member 118 out until the previously pulled trip lever 105 is cleared, upon which it is pulled back by its spring and the carrier 94 is freed, allowing the drive wheel 98 to clear the ground wheel and halt the motion of the plows. This same action, by releasing the push rod 123 on the opposite side of the machine, permits the latch member 118 (for example, at the lower part of Figure 2) to move inward ready for the next and reverse operation, at the end of the next furrow.

Thus it will be seen that the alternating operations at the ends of the furrows may be carried out merely by the operator pulling the proper trip rope and lifting his plow from the ground. The action is thus simple and straightforward and the mechanism is simple in construction as well as durable and trouble-free.

While I have herein set forth a certain preferred embodiment of my invention, it is understood that I may vary therefrom within the spirit of my invention and scope of the appended claims.

What I claim as new and desire to secure by Letters Patent is:

1. In a two-way plow of the character described, the combination comprising a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindles, winches operative to take up and pay out the cables, drive wheels for the said winches movable selectively into engagement with the ground wheels as the frame is raised for operating the cables and oscillating the spindle and plow bottoms, and means operative as the spindle moves a half turn to disengage the drive wheels from the ground wheels.

2. In a two-way plow of the character described, the combination comprising a frame, ground wheels and crank axles swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindle, axles movably supported on the frame, the cables being wound on said axles, drive wheels on the axles, and means operative under manual control for selectively and alternately engaging the drive wheels with the ground wheels when the frame is raised to thereby operate the cables to oscillate the spindle and attached plow bottoms.

3. In a two-way plow of the character described, the combination comprising a frame, ground wheels and crank axles swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindles, axles movably supported on the frame, the cables being wound on said axles, drive wheels on the axles, means operative under manual control for selectively and alternately engaging the drive wheels with the ground wheels when the frame is raised to thereby operate the cables to oscillate the spindle and attached plow bottoms, and the drive wheels having rubber tires for engaging the ground wheels.

4. In a two-way plow of the character described, the combination comprising a frame, ground wheels movably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindle, axles movably supported on the frame, the cables being wound on said axles, drive wheels on the axles, means operative under manual control for selectively and alternately engaging the drive wheels with the ground wheels when the frame is raised to thereby operate the cables to oscillate the spindle and attached plow bottoms, the said spindle having a grooved sheave for engaging and fastening the cables.

5. In a two-way plow of the character described, the combination comprising a frame, ground wheels operatively connected to the frame for raising and lowering the same, bearing means on the frame, a spindle journaled in the bearings for oscillating movements about a generally horizontal axis, right and left hand plow bottoms carried by the spindle and movable therewith to dispose the plows alternately in plowing positions, a grooved sheave on the spindle, cables connected to the sheave and leading in opposite directions laterally therefrom, axles positioned on generally transverse axes forward of the ground wheels, the ends of the cables being wound on the axles, rubber tired drive wheels on the axles and located in the same fore and aft plane as the ground wheels, means on the frame supporting the axles for forward and rearward movements, and remotely controlled means for moving the axles alternately in rearward directions to place the drive wheels in contact with the ground wheels as the frame is raised and thereby cause the cables to turn the spindle and bring the plow bottoms alternately into plowing positions.

6. In a two-way plow of the character described, the combination comprising a frame, ground wheels and crank axles swingably connected to the frame for raising and lowering the same, bearing means on the frame, a spindle journaled in the bearings for oscillating movements about a generally horizontal axis, right and left hand plow bottoms carried by the spindle and movable therewith to dispose the plows alternately in plowing positions, a grooved sheave on the spindle, cables connected to the sheave and leading in opposite directions laterally therefrom, axles positioned on generally transverse axes forward of the ground wheels, the ends of the cables being wound on the axles, rubber tired drive wheels on the axles and in the same fore and aft plane as the ground wheels, means on the frame supporting the axles for forward and rearward movements, latch means on the frame adjacent the axles, trip levers for selective engagement with said latch means and operative when so engaged to cause the associated axles to move its drive wheel rearwardly into contact with the adjacent ground wheel when the frame is raised and to thereby operate the associated cable and turn over the spindle and plow bottoms.

7. In a two-way plow of the character described, the combination comprising a frame, ground wheels and crank axles swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, a grooved sheave on the spindle, cables connected to the sheave and leading in opposite directions laterally therefrom, axles positioned on the frame adjacent the ground wheels, the ends of the cables being wound on the axles, rubber tired drive wheels on the axles, means on the frame movably supporting the axles, latch means on the frame adjacent the axles, trip levers for selective engagement with said latch means and operative when so engaged to cause the associated axle to move its drive wheel into contact with the adjacent ground wheel when the frame is raised and to thereby operate the associated cable and turn over the spindle and plow bottoms, and trip ropes connected to said levers for remotely controlling the position thereof.

8. In a two-way plow of the character described, the combination comprising a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, a grooved sheave on the spindle, cables connected to the sheave and leading in opposite directions laterally therefrom, axles positioned on generally transverse axes forward of the ground wheels, the ends of the cables being wound on the axles, rubber tired drive wheels on the axles and in the same fore and aft plane as the ground wheels, means on the frame supporting the axles for forward and rearward movements, latch means on the frame adjacent the axles, trip levers for selective engagement with said latch means and operative when so engaged to cause the associated axle to move its drive wheel rearwardly into contact with the adjacent ground wheel when the frame is raised and to thereby operate the associated cable and turn over the spindle and plow bottoms, and cam operated means for disengaging the latch means from the trip levers on completion of each turn over movement of the spindle and plow bottoms.

9. In a two-way plow of the character described, the combination comprising a frame, ground wheels swingably connected to the frame for raising and lowering the same, bearing means on the frame, a spindle journaled in the bearings for oscillating movements about a generally horizontal axis, right and left hand plow bottoms carried by the spindle and movable therewith to dispose the plows alternately in plowing positions, a grooved sheave on the spindle, cables connected to the sheave and leading in opposite directions therefrom, axles positioned on generally transverse axes forward of the ground wheels, the ends of the cables being wound on the axles, drive wheels on the axles, means on the frame supporting the axles for forward and rearward movements, stop members normally holding the axles in forward positions, latch members on the frame adjacent the axles, trip levers arranged for selective engagement with the latch members and having lugs operative to disable said stop members to permit the axles to move rearwardly and bring their drive wheels one at a time into driving engagement with the ground wheels while the frame is raised to thereby turn over the spindle and bring the plow bottoms alternately into plowing positions.

10. In a two-way plow of the character described, the combination comprising a frame, ground wheels on the frame, bearing means on the frame, a spindle journaled in the bearings for oscillating movements about a generally horizontal axis, right and left hand plow bottoms carried by the spindle and movable therewith to dispose the plows alternately in plowing positions, a grooved sheave on the spindle, cables connected to the sheave and leading in opposite directions therefrom, axles positioned on the frame and on generally transverse axes forward of the ground wheels, the ends of the cables being wound on the axles, drive wheels on the axles in the same fore and aft plane as the ground wheels, means on the frame supporting the axles for forward and rearward movements, stop members normally holding the axles in forward positions, latch members on the frames adjacent the axles, trip levers arranged for selective engagement with the latch members and having lugs operative to disable said stop members to permit the axles to move rearwardly and bring their drive wheels one at a time into driving engagement with the ground wheels to thereby turn over the spindle and bring the plow bottoms alternately into plowing positions, and cam means operated by the spindle for releasing the trip levers from the latch means after each turn over operation of the spindle and plow bottoms to thereby reposition the stop members and hold the drive wheels clear of the ground wheels of the plow.

11. In a two-way plow of the character described, the combination comprising a frame, ground wheels and crank axles swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, a grooved sheave on the spindle, cables connected to the sheave and leading in opposite directions laterally therefrom, axles positioned on generally transverse axes forward of the ground wheels, the ends of the cables being wound on the axles, rubber tired drive wheels on the axles in the same fore and aft plane as the ground wheels, means on the frame supporting the axles for forward and rearward movements, stop members normally holding the axles in forward positions, latch members on the frames adjacent the axles, trip levers arranged for selective engagement with the latch members and having lugs operative to disable said stop members to permit the axles to move rearwardly and bring their drive wheels one at a time into driving engagement with the ground wheels while the frame is raised and the plow is traveling to thereby turn over the spindle and bring the plow bottoms alternately into plowing positions, and hydraulic lift means for swinging the ground wheels and raising and lowering the plow frame.

FREDERICK F. HEITZIG.

REFERENCES CITED

The following references are of record in the file of this patent:

UNITED STATES PATENTS

| Number | Name | Date |
|---|---|---|
| 714,570 | Fowler | Nov. 25, 1902 |
| 2,304,383 | Strandlund | Dec. 8, 1942 |
| 2,426,548 | Capon | Aug. 26, 1947 |

FOREIGN PATENTS

| Number | Country | Date |
|---|---|---|
| 730,175 | France | May 9, 1932 |
| 2,420 | Great Britain | of 1858 |
| 265,607 | Great Britain | Jan. 26, 1928 |